W. W. TURNBULL.
MACHINE FOR MAKING ICE CREAM CONES.
APPLICATION FILED JAN. 12, 1917.
1,302,733.
Patented May 6, 1919.
10 SHEETS—SHEET 5.
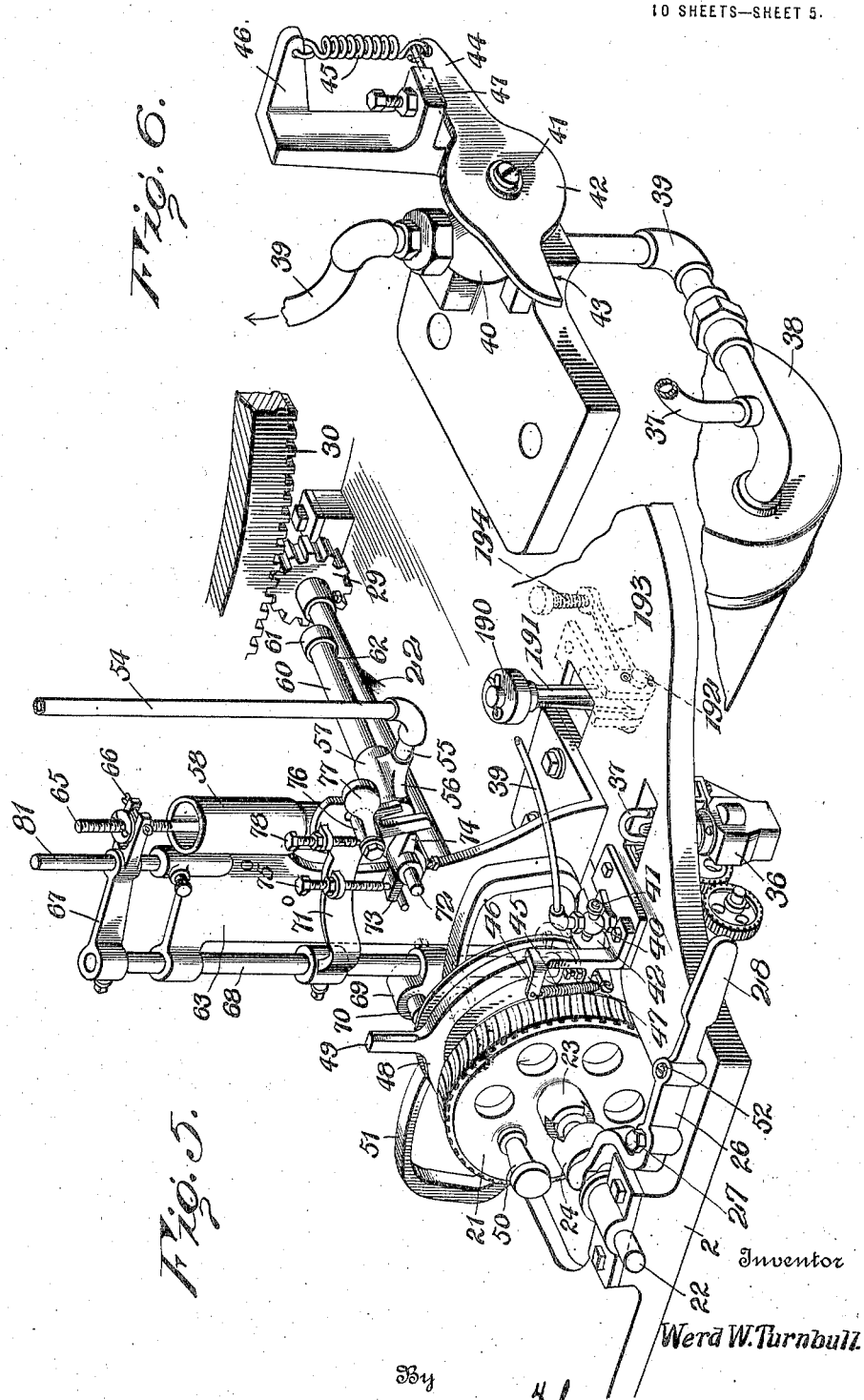
Inventor
Werd W. Turnbull

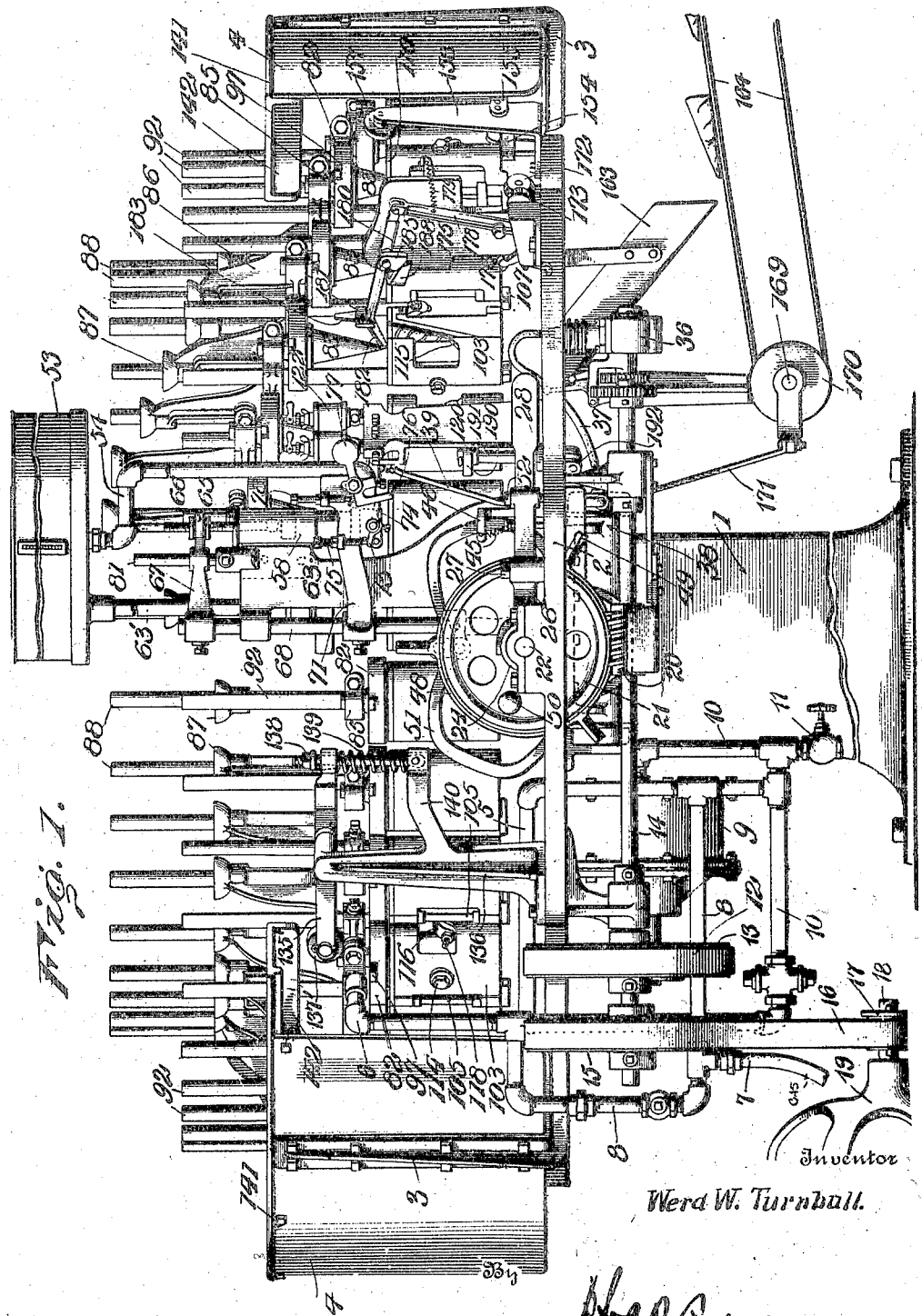

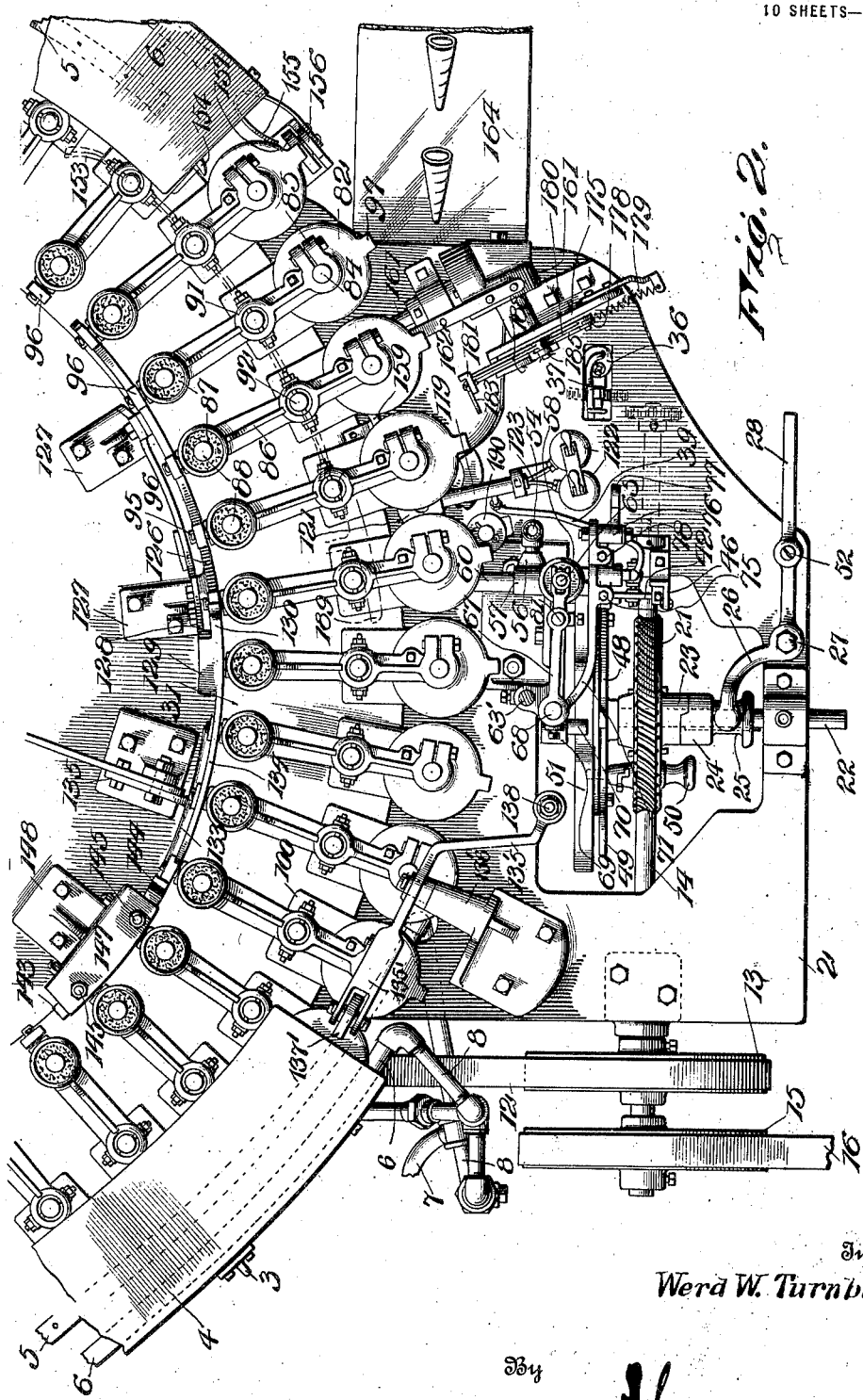

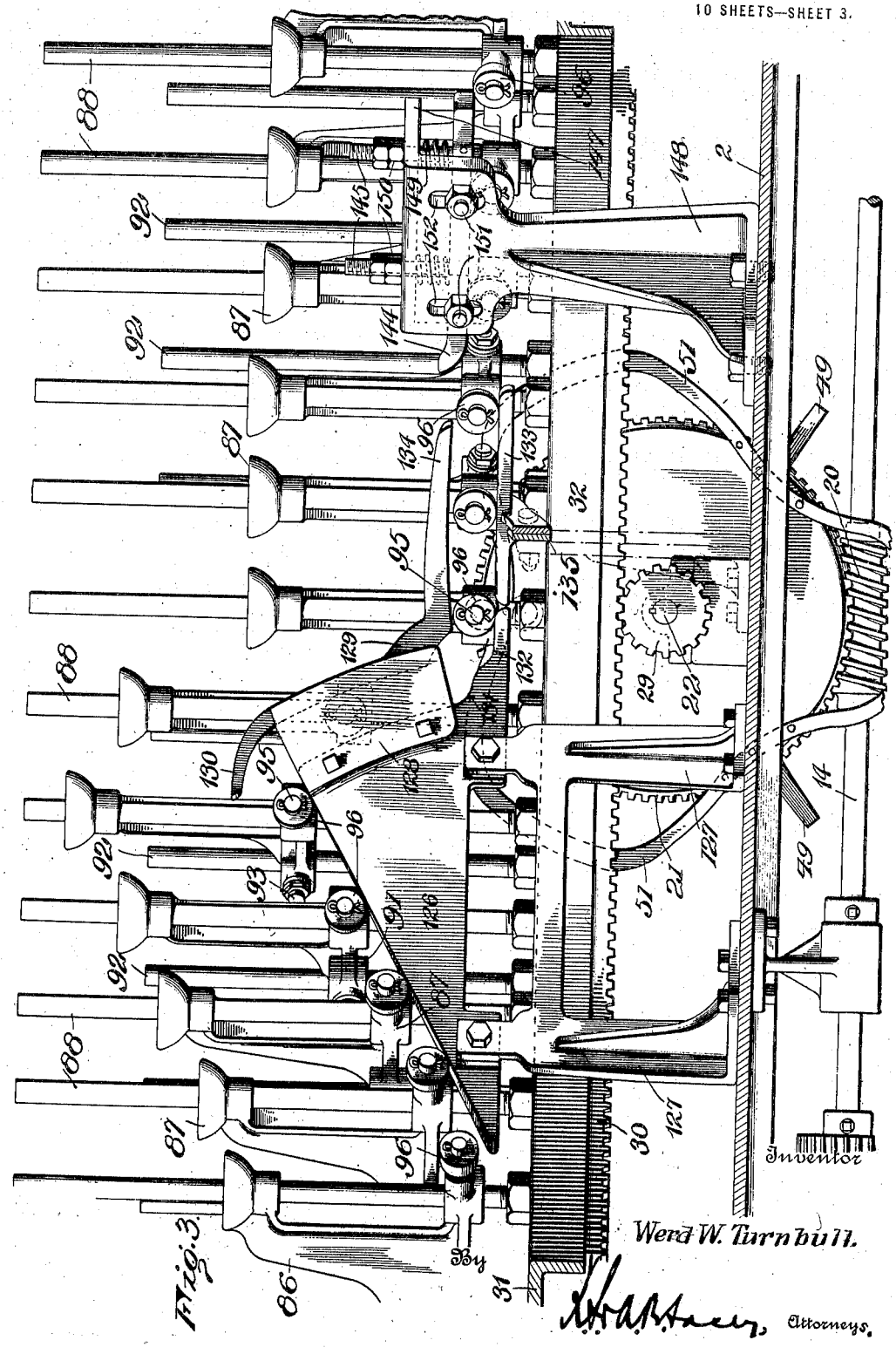

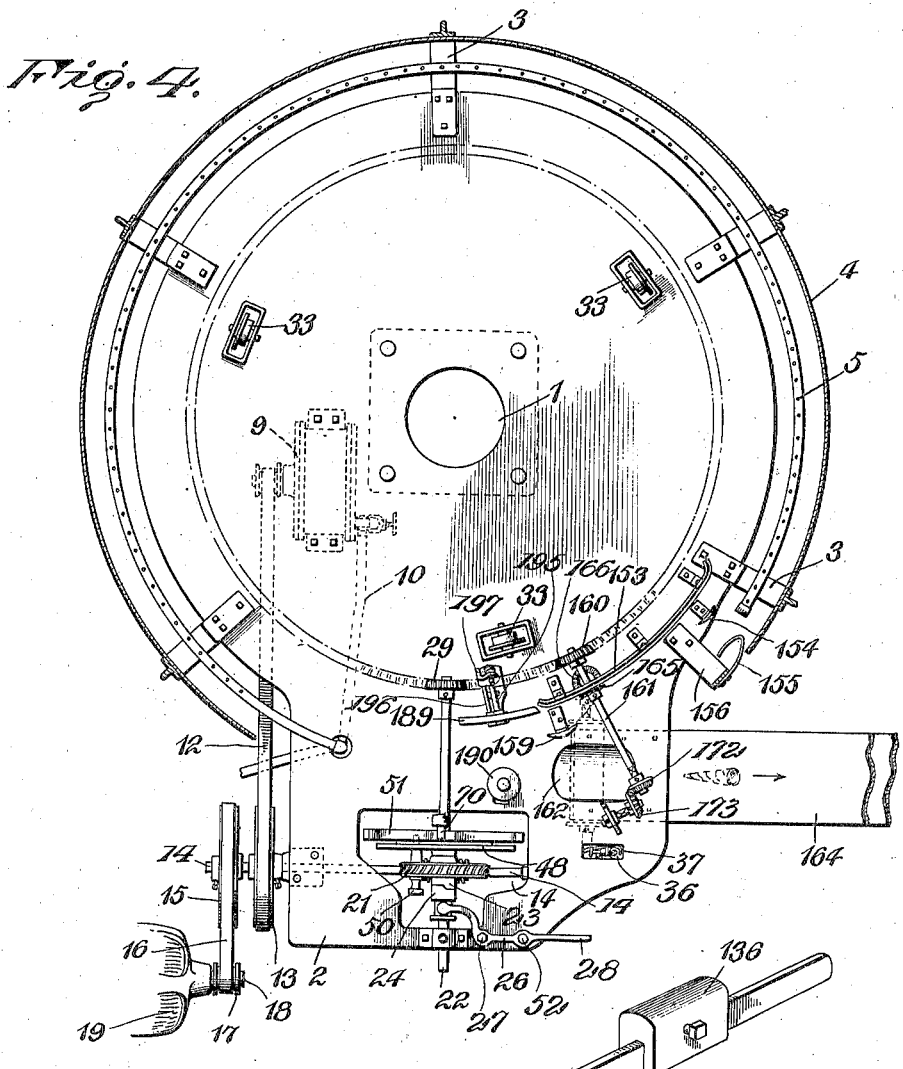
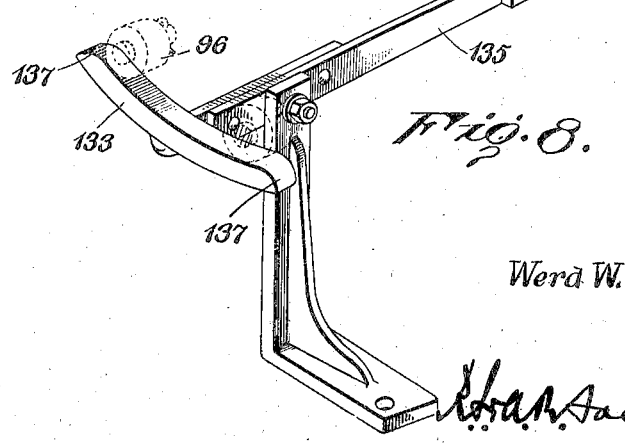

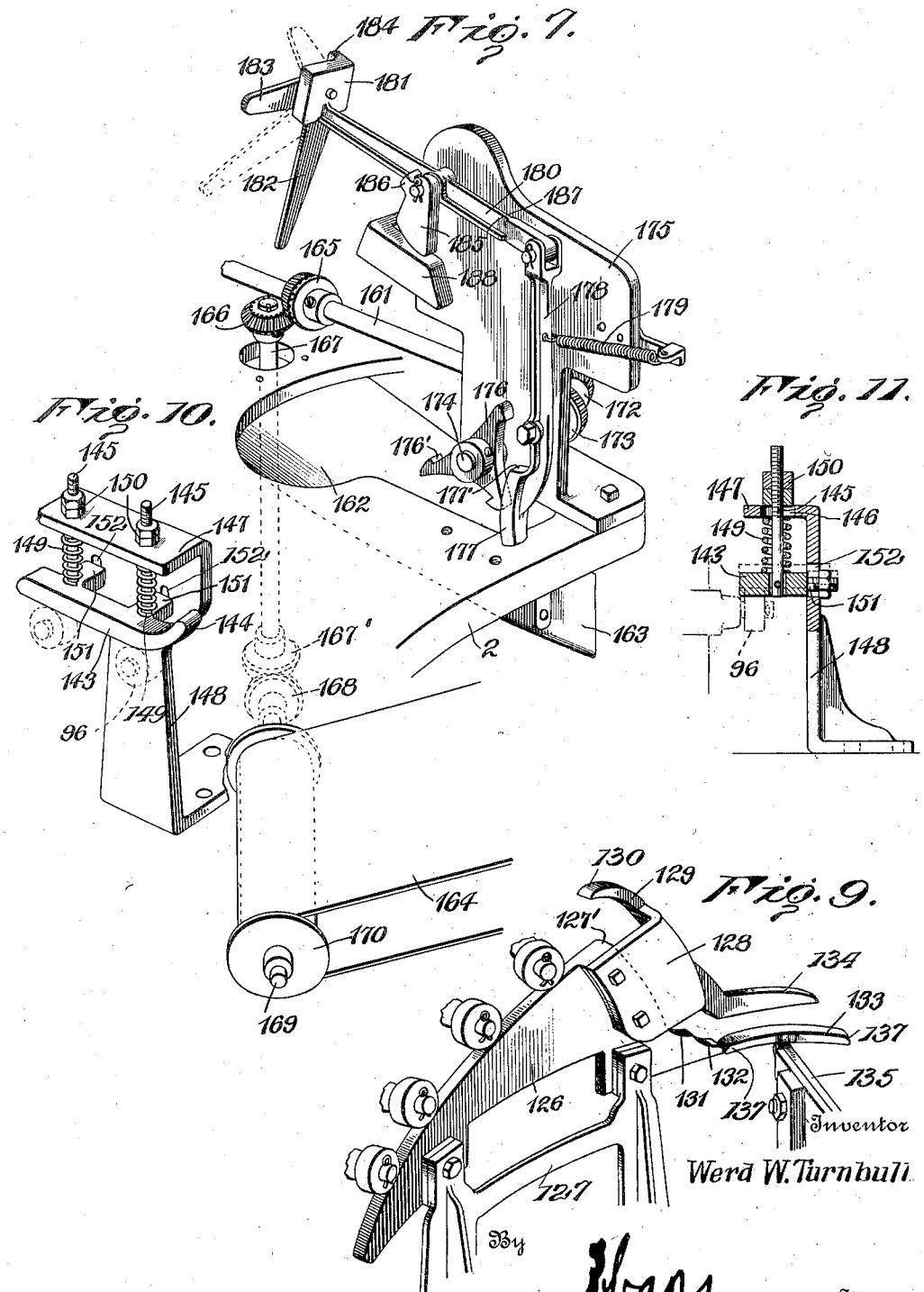

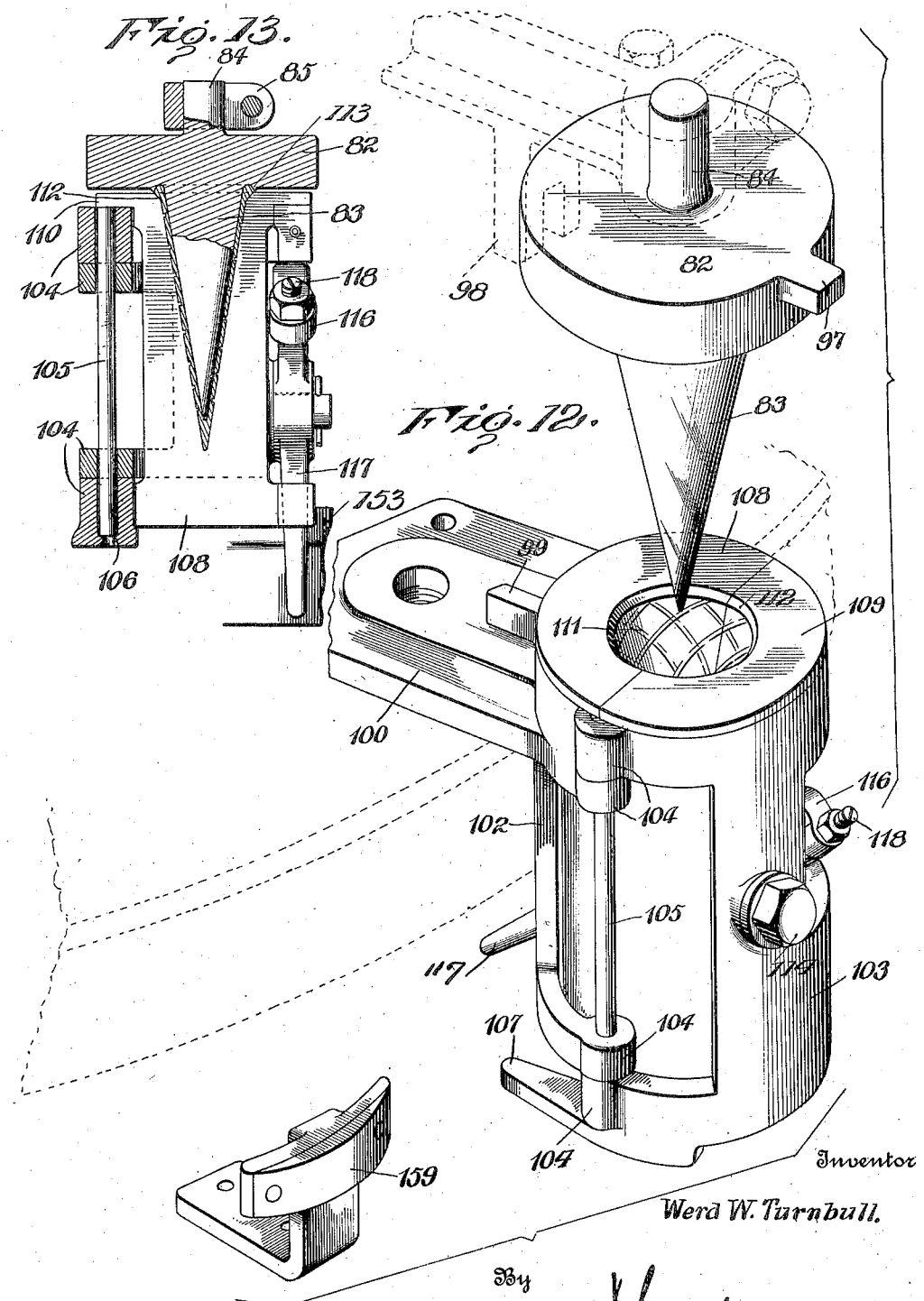

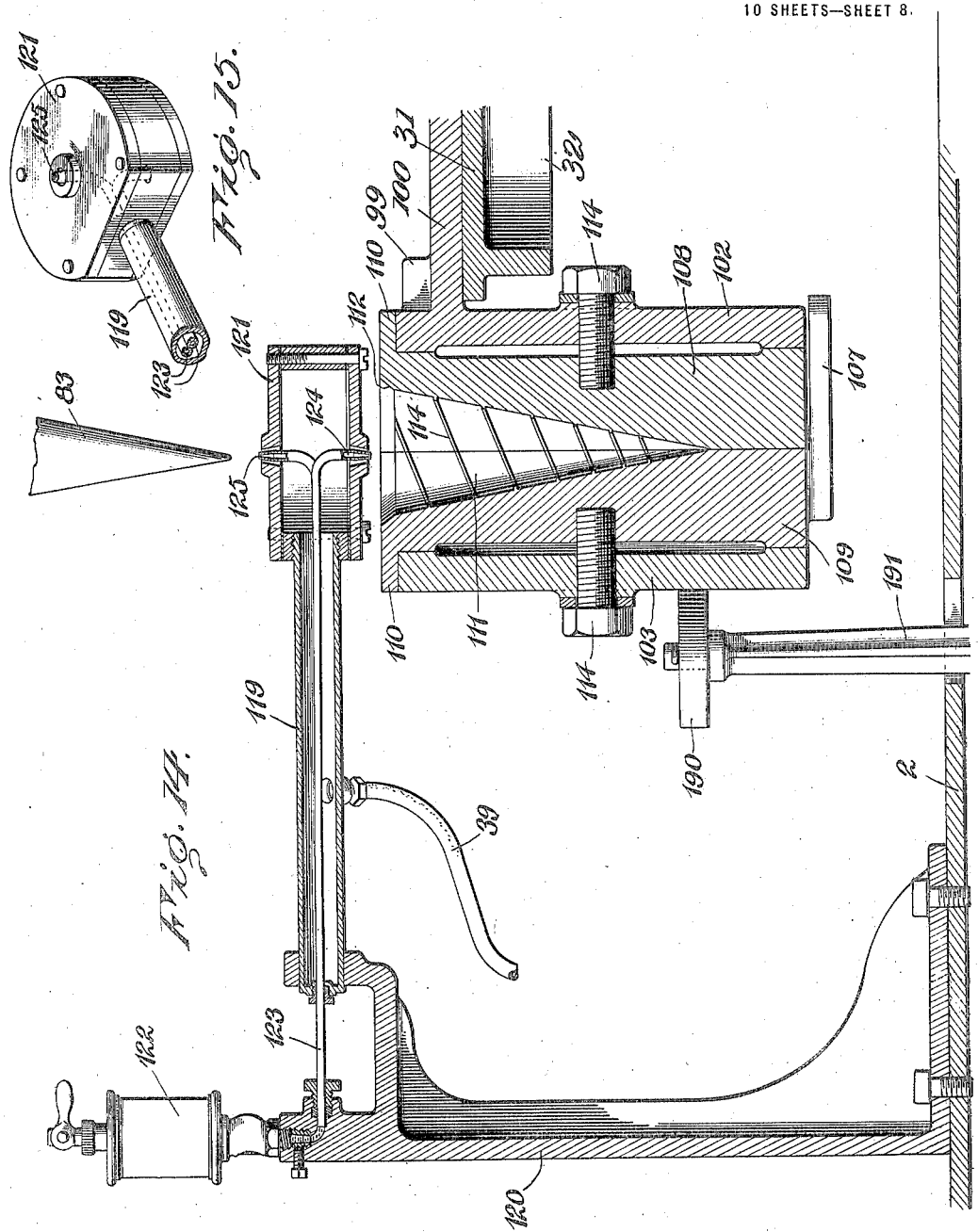

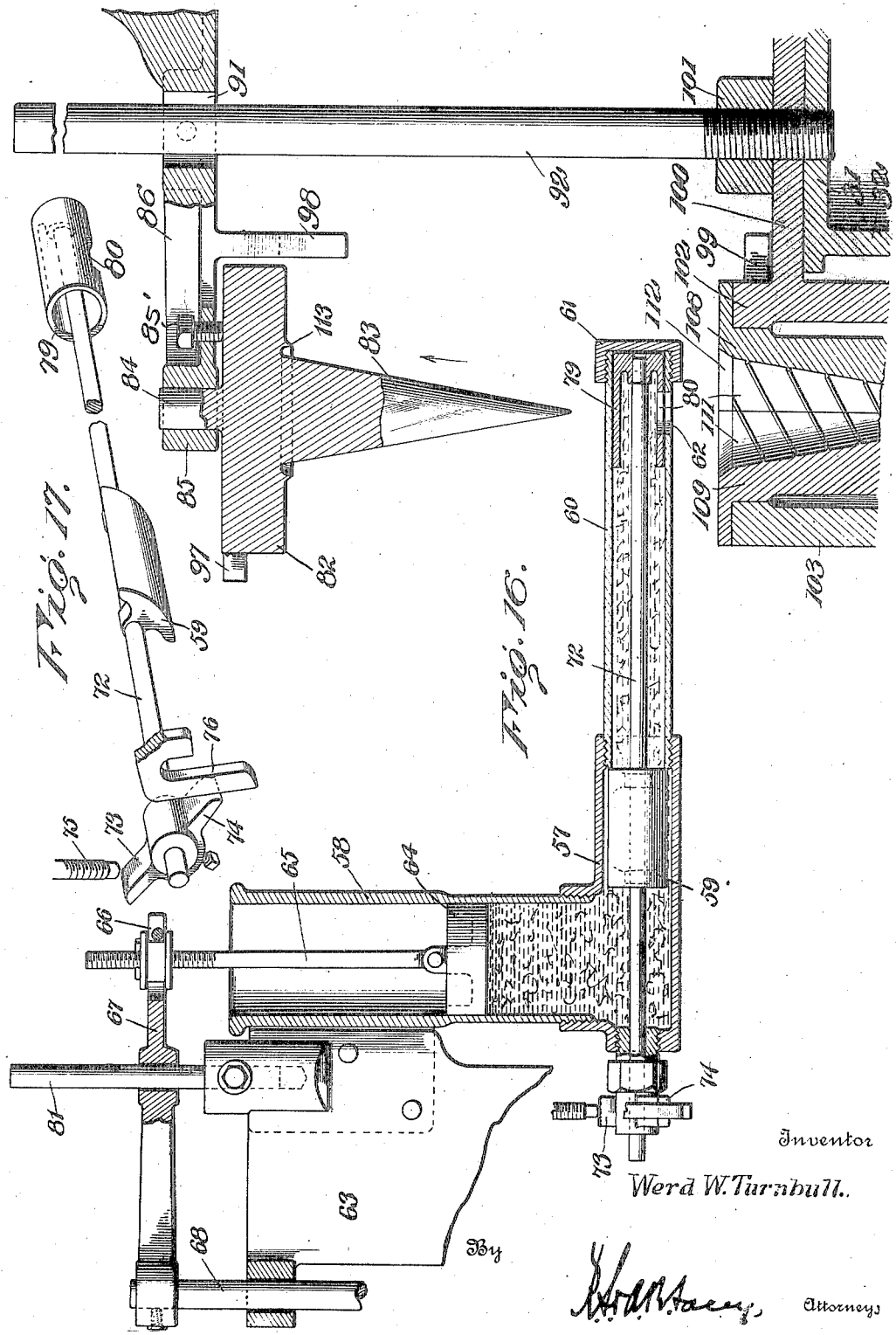

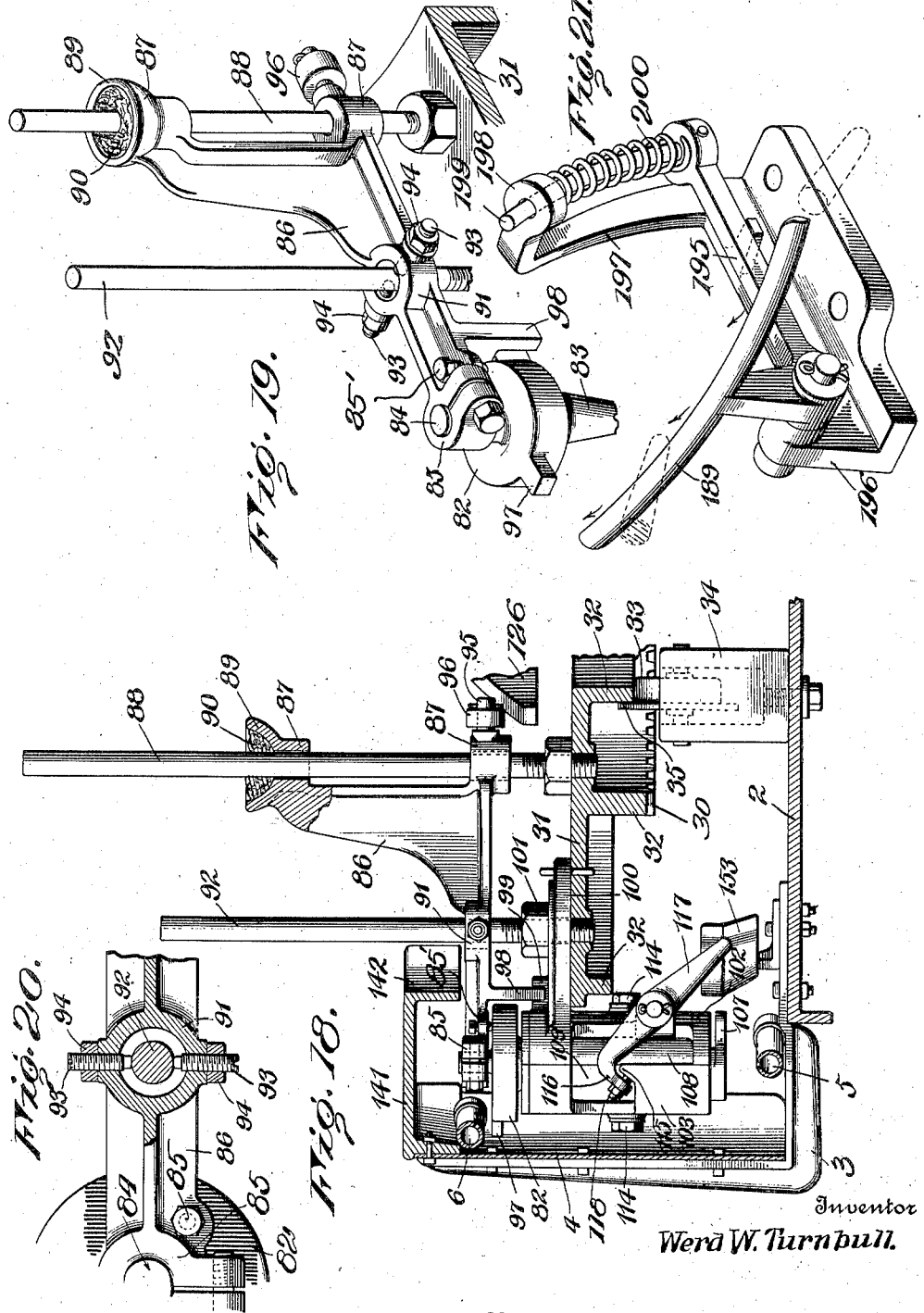

UNITED STATES PATENT OFFICE.

WERD W. TURNBULL, OF ASHEVILLE, NORTH CAROLINA.

MACHINE FOR MAKING ICE-CREAM CONES.

1,302,733. Specification of Letters Patent. Patented May 6, 1919.

Application filed January 12, 1917. Serial No. 142,060.

*To all whom it may concern:*

Be it known that I, WERD W. TURNBULL, a citizen of the United States, residing at Asheville, in the county of Buncombe and State of North Carolina, have invented certain new and useful Improvements in Machines for Making Ice-Cream Cones, of which the following is a specification.

This invention has for its object the provision of novel mechanism whereby, in a continuous cycle of operations, a measured batch of dough or batter will be fed into a mold or baking unit, the said mold vented to permit the escape of steam and then positively closed, the closed mold being carried over a path through which it will be subjected to heat so that the dough will be thoroughly baked, after which the mold will be loosened from the baked article and then fully opened to permit separation of its members, the baked article positively withdrawn from the mold and the mold then closed and returned to the inital point where it receives a fresh batch of batter or dough. The invention seeks to provide novel mechanism for accomplishing these several operations and also to provide a machine which will produce a superior article which will not be apt to break while being handled in the operations necessary to remove it from the machine and place it in packages for commercial purposes. Other objects of the invention will appear in the course of the following description and the invention resides in certain novel features which will be particularly pointed out in the claims following the description.

The improvements are illustrated in the accompanying drawings, in which:

Figure 1 is a front elevation of a machine embodying one development of the invention;

Fig. 2 is a plan view of the front portion of the machine;

Fig. 3 is an elevation of a portion of the machine viewing the same from the inside or center of rotation of the moving table;

Fig. 4 is a diagrammatic plan view;

Fig. 5 is a detail perspective view of the batch feeder or pump and the operating mechanism immediately adjacent the same;

Fig. 6 is a detail perspective view of a portion of the mechanism for effecting oiling or greasing of the mold members;

Fig. 7 is a detail perspective view of the ejector;

Fig. 8 is a detail perspective view of one of the members which coöperate to effect closing of the mold;

Fig. 9 is a detail perspective view of a cam by which the core is lifted from the mold and then returned to its position within said mold;

Figs. 10 and 11 are, respectively, a perspective view and a vertical section of one of the closing members;

Fig. 12 is a detail perspective view showing the core raised from the mold;

Fig. 13 is a vertical section of the mold showing the members in engagement with the cone formed between them;

Fig. 14 is a sectional view of the mold and the mechanism for oiling or greasing the mold members;

Fig. 15 is a detail perspective view of the oiler;

Fig. 16 is a longitudinal section of the pump or feeder for supplying a measured quantity of dough to the mold;

Fig. 17 is a detail perspective view of the valve or cut-off member of the pump;

Fig. 18 is a sectional elevation of a mold and its supports, together with the latch for holding the mold in closed position;

Fig. 19 is a detail perspective view of the support for the core;

Fig. 20 is a horizontal section through the set screws shown in Fig. 19;

Fig. 21 is a detail perspective view of a cam member for acting on the latch to throw the same in closed position and lock the mold.

In the illustrated form of the invention, a pedestal or other support 1 is firmly secured to the floor of the work room and this pedestal supports a stationary table or platform 2. The greater portion of the platform or table 2 is of a circular outline having the pedestal as its center, as shown clearly in Fig. 4, and brackets 3 are secured to and project from the said circular portion to support a hood, casing or oven 4 which is disposed concentric with the circular portion of the table and serves to prevent spreading of the flame from a lower gas burner 5 and an upper gas burner 6 and thereby avoids waste of heat so that the mold members or baking units, as they are carried around within this hood or casing, will be effectually heated and the dough within the mold thoroughly cooked. The gas is supplied to the burners 5 and 6 through a supply pipe 7 which will, of course, be connected with the city mains or a natural gas supply, and the said supply pipe will be connected with the burners through branch pipes 8, as will be readily understood. An air pump 9 is disposed at some convenient point below the table and is connected by a pipe 10 with the gas burners so that a supply of air under pressure may be delivered to the said burners and act as an injector to suck in gas in sufficient quantities to maintain an adequate supply at the burner tips and thereby keep the flame at the proper intensity. The air pipe 10 will preferably be equipped with a test or drain valve 11 which may be opened occasionally to test the pressure of air or to reduce the pressure by permitting a portion to escape as circumstances may demand. The main shaft of the air pump is connected by a belt 12 with a pulley 13 on the shaft 14 which is journaled in suitable bearings upon the under side of the table 2 near the front edge of the forward extension thereof. A pulley 15 is also mounted upon the said shaft and this pulley is connected by a belt 16 with a pulley 17 on the driving shaft 18 of a motor 19. The said motor may be of any desired type but I prefer to employ an electric motor because of the cleanliness of the same and the ease with which the actuating force may be utilized therein. The shaft 14 extends below the forward portion of the table 2 and is provided with a worm 20 which meshes with a worm wheel 21 carried by a shaft 22 journaled in suitable bearings upon the table 2, as will be readily understood. The worm wheel is loose upon the shaft and extends through an opening in the table so that it may mesh with the worm 20, as will be readily understood, and the worm wheel is further provided with a clutch hub 23 adapted to be engaged by a clutch sleeve 24 slidably mounted upon the shaft 22 but constrained to rotate therewith. The clutch sleeve 24 is constructed with an annular groove 25 which is engaged by the forked end of a shifting lever 26 fulcrumed upon the table at 27 and having one arm projecting beyond the end of the table to form a handle 28 by which the lever may be shifted. It will be readily understood that if the sleeve 24 be moved inwardly into engagement with the clutch hub 23, the shaft 22 will be locked to the worm wheel 21 and will consequently be caused to rotate. The said shaft is equipped at its inner end with a pinion 29 meshing with an annular rack 30 formed on the under side of the rotary table or mold carrier 31 so that, when the shaft is rotated, the said table or carrier will be caused to move in a circular path over the stationary table and carry the mold members or baking units between the burners 5 and 6 so that the said molds will be heated and the batter or dough therein will be baked. The table 31 is provided with depending rims or annular flanges 32 at its inner and outer edges and the inner rim or depending flange rides upon the rollers 33 which, as shown most clearly in Fig. 18, are mounted within the upper portion of the oil cups or reservoirs 34 which are secured to the stationary table 2. These rollers 33 are provided with annular flanges 35 which engage the outer surface of the inner rim 32 and thereby serve to center the rotary table or carrier with respect to the stationary table and the operating parts.

The shaft 14 is extended beyond the worm 20 and operates a force pump 36 to supply air through a pipe 37 to a reservoir 38 beneath the platform or stationary table. An outlet pipe 39 leads from the said reservoir and is equipped just above the platform with a valve, indicated at 40, having its stem 41 provided with a lever 42 having an anvil arm or face 43 at one side of the stem and provided at the opposite side of the stem with an arm 44 which is connected by a spring 45 to a bracket 46 secured upon the table 2. A stop 47 projects from the said bracket into the path of the arm 44 and thereby limits the upward movement of the same under the influence of the spring 45, the action of the spring being to hold the valve normally closed. In rear of and adjacent the worm wheel 21 is a ring tappet or disk 48 constructed with projections 49 adapted to impinge against the surface 43 and thereby swing the lever 42 against the tension of the spring 45 so that the valve 40 will be opened and a jet of air permitted to escape and carry a supply of oil to the mold members, as will presently be more fully set forth. The ring or disk 48 is disposed concentric with the shaft 22 but is not secured to the same, a pin 50 being provided to be inserted through registering openings in the wheel 21 and the disk or ring 48 to hold the said members in proper timed relation and cause the disk or ring to rotate with the worm wheel. A cam 51 is disposed loosely upon the shaft 22 in rear of but adjacent the disk or ring 48 and the pin 50 is so disposed that it will also engage an opening provided therefor in the said cam and thereby connect the cam with the ring or disk and the worm wheel so that uniform rotation of these parts will be effected. It will be readily understood that the pin 50 is withdrawn except when it is desired to operate the machine so that the rotation of the worm wheel, due to its meshing with the worm 21 on the shaft 14, will not cause rotation of the shaft 22 nor of the disk nor the cam unless the pin 50 has been turned home and the clutch hub 23 engaged by the clutch sleeve 24. A locking pin 52 is provided in the lever 26 to engage a socket in the table 2 and thereby hold the clutch sleeve in engagement with the clutch hub when the parts are to operate. The cam 51 is arranged to operate the batch-measuring ejector or pump and it is, therefore, obvious that there must be perfect synchronism between the operation of the said cam and that of the ring or disk 48 so that the oil will be ejected at the instant when the core and mold are in position to receive the ejected oil and that the charge of batter must be deposited before the core is lowered. It will be understood that the pin 50 is spring-pressed so as to be normally projected toward the disk and cam and is carried by the gear. This synchronism is obtained by adjusting the cam and disk before the pin 50 is pushed home to lock the parts together. I prefer to employ a three-part cam so that the pump or dough ejector will be operated three times during one revolution of the shaft 22 and the disk or ring 48 is, therefore, provided with three tappet arms or projections 49 which are disposed at the low parts or junctions of the operating surfaces of the cam.

The batter is placed in a hopper 53 supported in any desired manner from the stationary table or platform and an outlet pipe 54 leads from the said hopper to the batch-measuring and ejecting pump which is situated above the shaft 22 and in rear of the cam 51. The hopper may be conveniently supported by a post 63' carried by a bracket or standard 63 which is rigid upon the table. The pipe 54 has a branch 55 at its lower end which terminates in a flared nozzle or mouth 56 forming a part of a sleeve or casting 57 which serves the function of a support for the pump cylinder 58 and a casing for the valve or cut-off 59 as well as a connection for the sleeve or tube 60 which extends inwardly and has its inner extremity disposed in the plane of movement of the molds. The inner extremity of the sleeve 60 is closed by a cap 61 and an outlet port 62 is formed in the lower wall of the sleeve adjacent said cap so that batter, escaping through said port, will pass into a mold which will have arrived at a point immediately below the said sleeve in the operation of the machine. The pump cylinder 58 is secured rigidly to the bracket 63 and a plunger 64 is mounted to reciprocate within the cylinder. This plunger is carried by the lower end of a piston rod 65 which has its upper end threaded or otherwise adjustably mounted in a fork 66 at one end of a rod 67 which is secured to the upper end of a pitman or reciprocating rod 68, the said rod 68 being mounted in suitable guides or bearings upon the bracket 63 and the table 2 and provided with an offset 69 carrying rollers 70 arranged to ride upon the cam 51 so that as the said cam rotates, a vertical reciprocating movement will be imparted to the rod 68, as will be readily understood.

An arm or bracket 71 is secured rigidly to the rod 68 and projects therefrom to a point over the inner end of the rotary valve stem or rod 72 which is mounted in and extends through the end of the casting 57, as shown most clearly in Fig. 16. Oppositely extending cranks 73 and 74 are secured to the front end of the valve rod 72 and these cranks extend into the paths of tappets carried by the arm 71. One of these tappets is in the form of a screw 75 mounted in a lug on the arm 71 and disposed over the crank 73. The other tappet is in the form of an angle lever 76 pivoted upon the arm 71 at the free end thereof and having its depending branch adapted to ride against and over the crank 74 while the other member of said angle lever projects laterally and is equipped with a weight 77, as clearly shown. A stop screw 78 is mounted upon the arm 71 above the said angle lever and is adjustable toward and from the upper laterally extending member of said lever to limit the throw of the same.

The wing valve 59 is so located upon the valve rod or stem 72 that it will play over the mouth or opening of the nozzle 56 and will thereby serve to control the flow through the said nozzle. Upon the inner end of the valve rod or stem 72 is a rotary sleeve valve 79 which is rigid with the rod and is provided with a port 80 adapted to register with the port 62 in the valve casing or sleeve 60 and thereby serve to, in one position, permit the escape of the batter, while in another position it will be out of alinement with the port 62 which will, consequently, then be covered so that the batter cannot flow through the same. 81 designates a guide rod for the arm 67 which rises from the bracket 63 and thereby serves to steady the arm in its movements.

Upon the down stroke of the plunger 64, the arm 71 will also be carried downward so that the depending member of the angle lever 76 will strike against the crank 74 and depress the same whereby the rod 72 will be rotated in such direction that the wing valve 59 will be carried over the mouth of the nozzle 56 and further flow of the batter be thereby arrested. The pressure of the plunger will then be exerted upon the batter within the cylinder 58, the casting 57, and the sleeve or tube 60, so that a portion of the batter will be expelled through the ports 80 and 62 into the mold which is then positioned to receive it, it being understood that the rotation of the rod 72, under the influence of the angle lever 76, causes the sleeve valve 79 to rotate and bring the ports 80 directly over the port 62. The parts are so proportioned and arranged that immediately after the ejection of enough batter to form a cone, the angle lever 76 will slide off the crank 74 and the tappet screw 75 will then impinge against the crank 73 and rotate the rod 72 in the opposite direction so that the valve 59 will uncover the mouth of the nozzle 56 and the port 80 will be carried out of axial alinement with the port 62. The tappet 75 may obviously be adjusted so as to regulate the throw of the crank and the degree of rotation of the valve rod 72. The downward movement of the plunger, prior to the impact of the tappet 76 upon the crank 74, merely causes the batter to work back up in the pipe 54, and will consequently keep the same agitated so that separation of its component parts will not occur. Upon the return stroke of the plunger, the tappet 75 will simply recede from the crank 73 while the tappet 76 will ride over the crank 74 without disturbing the same and the batter will then be drawn into the casting 57 and fill the tube 60 and the cylinder 58. The moisture from the batter will serve to keep the cylinder 58 and the parts connected therewith cool so that wear upon the piston and the cylinder, due to heating of the same, will be avoided and no premature baking of the batter will occur but the batter deposited in the mold will be raw throughout its mass and in proper condition for subsequent cooking.

The baking units are carried by the moving table or carrier 31 and comprise a core and a mold, the latter being mounted within a holder so that molds of various designs may be employed and cones having any desired surface markings or ornamentation produced. The core comprises a circular head 82 and a conical body 83 depending centrally from the said head. A stud 84 is formed upon the upper side of the head 82 and this stud is engaged within a clamp 85 formed on the outer end of a carrying bracket 86 which is provided at its inner end with upper and lower guide lugs or ears 87 adapted to fit loosely about a standard or post 88 rising from the carrier or moving table 31, the upper guide or ear 87 being of cup form on its upper side, as shown at 89, to receive a lubricant 90 so that the vertical movement of the bracket 86 upon the post 88 will be smooth and easy. Intermediate its ends, the bracket 86 is constructed with an annulus 91 fitting around but spaced from a guide pin or post 92 rising from the carrier 31 and in the walls of the said annulus 91, at diametrically opposite points of the same, are set screws 93 which are adapted to bear against the guide pipe or post 92, as shown clearly in Fig. 20. These set screws are to be adjusted when the machine is set up so that they will just touch lightly against the pin or post 92 and be thereby enabled to slide freely upon said post. Owing to its form and weight, the carrying bracket 86, in the operatiton of the machine, will tend to oscillate and bind against the rod 88. The heat in the machine causes expansion of the parts but the bracket 86, being less exposed to the heat than the parts to which the rods 88 and 92 are secured, does not expand to the same extent and there is a tendency of the rods 88 and 92 to move apart a distance greater than the distance between the bearings 87 and 91. If, therefore, the annulus 91 were a close-fitting lubricating bearing, the arm 86 would bind upon the guide rod 92 and the oil would be burned by the heat of the rod. By the construction illustrated, the set screws 93 serve as effectual guides and there is ample room to accommodate the expansion. The set screws 93 are secured in their adjusted position by lock nuts 94 mounted on the said set screws and adapted to be turned home against the annulus 91, as shown in Fig. 20 and as will be readily understood. The lower guide 87 is provided with an inwardly extending lateral stud 95 on which is journaled a roller 96 adapted to engage various cam surfaces in the operation of the machine, as will presently appear, and upon the head 82 of the core is a forwardly projecting lug or tooth 97 the function of which in the operation of the machine will be hereinafter set forth. Upon the under side of the carrying bracket 86 and adjacent the head 82 of the core is a depending notched lug 98 which is adapted to engage over a lug 99 on the mold and thereby accurately center the core and mold relative to each other so that the cone will have a wall of uniform thickness throughout its extent.

The mold comprises two similar sections which are adapted to be separated in a horizontal plane and are carried by a holder consisting of two sections hinged together, one section of the holder being provided at its upper end with a laterally extending arm, lug or bracket 100 which extends over and rests upon the table 31 and is secured directly thereto. As shown most clearly in Figs. 16 and 18, the lower end of the guide pin or post 92 extends through and is threaded in this arm or lug 100 and in an opening in the carrier 31 and a nut 101 is fitted upon the guide pin and bears upon the said lateral projection or arm so that it will be secured firmly to the table. The lug 99 is illustrated as formed upon the upper side of the projection 100. The holder section 102, upon which the projection 100 is formed, and the section 103 are provided at their upper and lower ends with registering perforations or lugs 104 through which a hinge pin or pintle 105 is inserted so as to pivotally connect the said sections and permit the outer section 103 to be swung in a horizontal plane to and from the inner relatively stationary section 102. The lowermost lug 104 has the bore or opening therethrough reduced in diameter at its lower extremity, as shown at 106, so that the pin 105 will rest on the annular shoulder thereby provided and be held in position by gravity without requiring the use of any extraneous fastening devices. The section 103 is also provided at its lower end with an inwardly projecting finger 107, the purpose of which will presently appear. The said sections 102 and 103 are cut away at diametrically opposite points so as to reduce the dead weight of the moving parts of the machine and thereby lessen the power needed to drive the same, and also permit access of heat to the molds and provide for an even distribution of the heat.

The mold consists of two similar semi-cylindrical members 108 and 109 which are provided at their upper ends with over-hanging flanges or shoulders 110 adapted to rest upon the upper end edges of the holder sections 102 and 103 and extend over the pintle 105 and thereby prevent the said pintle rising during the operation of the machine. It will be noted that the pintle cannot move in either direction and separation of the hinge while in use cannot, therefore, occur. These sections have plane inner faces which are adapted to abut and fit closely together so as to form practically a ground joint and are also constructed with tapered recesses 111, which, when the sections are brought together, constitute a conical cavity to receive the batter and in which the conical body 83 of the core may enter. It is to be noted that the upper edge of the recess 111 is beveled or given an increased flare, as shown at 112, and a slight rib or ridge 113 is formed on the under side of the head 82 in concentric spaced relation to the body 83 to act as a cutter and pass through the surplus dough which will collect upon the upper end of the mold around the opening therein. The extreme lower edge of this rib 113 will meet the upper end of the mold immediately adjacent the outer extremity of the flared or beveled portion 112 and a bead of dough will thus be formed around the upper edge of the cone so as to reinforce the same and thereby guard against cracking or breaking of the cone around its upper end or mouth. This rib may be slightly nicked at intervals so as to avoid a complete severance of the surplus dough from the body of the cone or it may be so proportioned that it will just fail to touch the upper end of the mold and thereby leave a very thin attaching web of dough so that the surplus material will not be left upon the mold when the cone is discharged. It is obvious that this small surplus material will bake with the body of the cone and if it were not removed would tend to drop into the mold when the same is opened and thereby interfere with the successful operation of the machine. Up to the present time, I have found it advantageous to permit this surplus material to be removed with the cone and subsequently crack it from the cone, the connecting web being so thin that the surplus crust may be removed without splitting or breaking the cone. The described construction permits the mold members 108 and 109 to be removed from the holder, consisting of the sections 102 and 103, and the surfaces of the recesses 111 may be given any desired configuration so that cones of any desired surface design may be produced. I furnish mold members of a stock design, but my invention contemplates the provision of mold members having the name and address of a manufacturer formed therein so that the cone produced in the machine will have thereon the name and address of the manufacturer of the cone, and these mold members may be substituted for regular stock mold members or mold members of any other special design may be substituted therefor.

It will be understood that the clamp 85 carries the core. In order to obtain an accurate adjustment of the core relative to the mold, the parts are assembled and set screw 85', mounted in the bracket 86 and bearing on the head of the core, is turned home so that the core will not be forced upward relative to the clamp by the resistance of the batter to its entrance in the mold. A fine adjustment of the rib 113 relative to the mold can be obtained by turning the set screw before the clamp is fully tightened as will be readily understood.

As shown most clearly in Fig. 14, the members 108 and 109 are reduced externally between their upper and lower ends and set screws or stud bolts 114 are mounted in the holder and engage the mold members so that, if the screws or bolts be turned home, the members 108 and 109 will be held in close engagement so that leakage of batter, with the consequent production of an imperfect cone, will be prevented. A tooth 115 (best shown in Fig. 18) is provided on the holder section 103 and this tooth is adapted to be engaged by the beak or hook-shaped upper end 116 of a latch 117 which is fulcrumed upon the holder section 102, the lower end of the said latch extending inwardly and downwardly so as to be engaged by suitable devices and thereby lock or release the mold members at certain periods in the travel of the carrier. A set screw 118 is mounted in the beak 116 so as to be adjusted through the beak and thereby compensate for wear or for any slight inaccuracy of the parts due to the rough surface produced by casting. The provision of this set screw 118 permits me to effect a tight and secure closing of the mold under all conditions.

When the mold is in position to receive a charge of batter, as shown in Fig. 16, the core is withdrawn from and disposed above the mold so that they will be respectively over and under the tube 60. The mold and core are separated vertically before they reach the point illustrated in Fig. 16, and when so separated and about to proceed to the point where they will receive the batter, they are treated with a thin film of oil by the means illustrated more particularly in Fig. 14. This Fig. 14 shows the upper portion of the pipe 39 leading into a pipe or tube 119 which is supported by a bracket 120, rising from the stationary table 2, and extends horizontally from said bracket to a casing or drum 121 which is so disposed that it will lie between the core and the mold when the same are separated. Oil cups 122 are supported upon the bracket 120 and small tubes or oil pipes 123 extend from the said oil cups through the tube 119 into the casing head or drum 121, one of said tubes 123 having its extremity turned downwardly and disposed centrally within the lower side of the head 121 while the other tube 123 has its extremity turned upwardly and disposed centrally within the upper side of the said head, as shown at 124 and 125 respectively. The upper and lower sides of the head are provided with annular openings which are slightly greater in diameter than the terminals of said tubes and are disposed concentrically with the said terminals. It will be readily understood that the air under pressure, flowing through the tube 119, will escape through the openings in the upper and lower sides of the head 121 and will thereby suck from the terminals 124 and 125 a thin film of oil which will be vaporized and deposited upon the inner surface of the recesses 111 and the outer surface of the body 83 in a spray so that the batter which is deposited in the recesses 111 and which is penetrated by the body 83 will not adhere to the said parts. The oil employed for this purpose will be of some edible and harmless character, as will, of course, be understood.

The core and mold are separated by causing the core to rise and this result is attained by interposing in the path of the rollers 96 a cam 126 which consists, preferably, of a substantially wedged-shaped plate secured rigidly to the stationary table 2 by means of a suitable bracket 127 and disposed over or adjacent the inner edge of the moving table or carrier. This cam 126 is so located that the roller 96 will reach the highest point of the cam just after a batch of dough or batter has been deposited in the mold so that the continued travel of the carrier will cause the roller to ride down the steep short surface 127' of the cam and permit the body 83 of the core to penetrate the dough in the bottom of the recess 111.

A guide plate 128 is secured to the cam 126 at the butt end thereof and this guide plate 128 is constructed with a rib or rail 129 which is spaced from but overhangs the surface 127' of the cam. The upper extremity of this rail projects above the path of the roller 96 so that when the roller reaches the highest point of the cam 126 its continued travel will bring it against the overhanging extremity 130 of the rail 129 and it will be thereby deflected downwardly so that it cannot jump beyond the surface 127'. The said surface merges into a step or stop 131 so that the head 82 does not immediately come into contact with the upper end of the mold but will be arrested in a slightly spaced relation to the mold so that the steam which is generated by the impact of the moist batter against the mold, will be permitted to escape without causing an explosion or fracturing the cone. A second step or stop 132 may be provided below the stop 131 to further retard the complete closing of the mold, and immediately adjacent the said stop 132 is a rail 133 which receives the rollers 96 in the continued travel of the same. The rail 129 is provided with an extension 134 which projects over the rail 133 but is spaced above the same so as to permit vertical play of the rollers while, at the same time, preventing their rising to such an extent as will permit a complete separation of the mold and core. The rail 133 is secured to or formed upon the outer end of a lever 135 which is fulcrumed upon a suitable bracket or standard secured upon the stationary table 2, and projects inwardly beyond the bracket where it is equipped with a counterbalance weight 136. This weight is adjustable upon the lever 135 so that it will operate effectually to sustain the weight of the cores thereon and prevent dropping of the said members. The ends of the rail 133 are beveled or curved, as indicated at 137, so that the movement of the rollers 96 onto and from the said rail will be free of any abrupt shocks. The weight 136 positively tends to lift the rail 133 but there will always be at least one roller upon the rail and the extension 134 of the rail 129, by its engagement with the roller or rollers then on the rail, prevents the rail rising to such an extent that the succeeding roller will have difficulty in passing onto the same.

It is to be understood that after the machine has been in operation but a very short time, the mold and core become thoroughly heated and will retain the heat so that it is possible to bake cones for an appreciable period of time even after the flow of fuel be cut off. As the batter which is deposited in the mold is moist and is immediately penetrated by the core so that it is expanded and spread over the entire inner surface of the mold, steam is at once generated and if this steam were confined within the mold it would tend to force the members of the mold violently apart and shatter the partly formed cone. To avoid this action, I have provided the rail 133 which prevents the core dropping so as to completely close the mold and I thereby effectually vent the apparatus. It is, of course, desirable and necessary to effect a complete closure of the mold and to this end, I provide a closing lever 135' which is supported upon a suitable bracket 136' secured upon the stationary table 2 and is disposed longitudinally with respect to the direction of travel of the molds. This lever carries a roller 137' which is adapted to bear upon the upper surface of the head 82 immediately after the roller 96 clears the rail 133 and thereby force the said head downward so that a complete closure of the mold will be effected. At the end opposite the roller 137', the lever 135' is engaged upon a set bolt 138 around which is coiled a spring 139 between the lever and an arm 140 extending from the bracket 136'. The spring can be placed under any desired compression and tends to expand so as to force the roller 137' yieldably toward the molds. After passing from under the roller 137', the head 82 immediately enters below the inwardly projecting hood or top plate 141 of the oven or casing 4 and this top plate or hood 141 is provided with a depending rim 142 at its inner edge which extends close to the arm 86 and thereby prevents the said arm, with the head connected thereto, from rising. In order to complete the closing of the mold, I provide a presser block 143 which is shown in detail in Figs. 10 and 11. This presser block is provided with an upturned end 144 so that the roller 96 meeting the same will be readily guided under the block, and it is carried by links or hangers 145 rising therefrom and passing through openings 146 in a forwardly projecting plate 147 formed at the upper edge of a bracket 148 which is secured to the stationary table 2. Springs 149 coiled around the links or hangers 145 between the plate 147 and the block 143 tend to hold the block in a lowered position and the downward movement of the block is limited by nuts 150 mounted upon the links or hangers and adapted to bear upon the upper side of the plate 147, as shown and as will be readily understood. The downward movement of the block is further limited and the block is guided by lateral tongues 151 extending through slots 152 in the upper portion of the standard or bracket 148, as shown.

When the mold passes below the top member 141 of the casing 4 it is subjected to the heat from the burners 5 and 6, the burner 5 playing upon the mold and the burner 6 playing upon the core. These burners extend approximately around the entire circular portion of the machine, as indicated in Fig. 4, so that the mold and core will become highly heated and the batter will be thoroughly baked. As the molds successively approach the ends of the burners which are located immediately adjacent the discharge end of the casing, the latches 117 are released and the molds are opened, after which the cone is positively discharged and deposited upon a carrier to be transported to the stock room for assembling in packages. The lower end of the latch 117 will ride against the outer side of a cam 153 and will thereby be swung downwardly and outwardly so that the beak 116 will be withdrawn from engagement with the tooth 115 and the mold members will then be free to swing apart. The finger 107 will then immediately ride against a short fixed cam or plug 154 so that, as the mold leaves the casing, the outer section of the mold will be swung outwardly from the inner section thereof, thereby loosening the same from the cone which will be held against the inner member by the core. The outer mold member, however, immediately impinges against a closer 155 in the form of a leaf spring or resilient plate secured upon a standard 156 rising from the stationary table 2 so that the mold will be opened only momentarily and then at once closed. As the mold passes from the closer 155, the lug 97 on the core will come into contact with a roller 157 on the upper end of the standard 156 and will be thereby slightly lifted so that the core will be loosened and slightly withdrawn from the cone. The roller 96 at the inner end of the carrier arm 86 will then start to ride up along the inclined surface of the cam or wedge 126 so that a continued upward movement will be imparted to the core and it will be entirely withdrawn from the cone and the mold. While the core is being thus withdrawn, the mold will be fully opened, the cone ejected, the mold then closed, and the parts sprayed with oil before they reach the batter-receiving position. To fully open the mold, a cam 159 is provided, this cam being similar to the cam 154 and illustrated fully in Fig. 12. The finger 107 strikes the said cam and thereby swings the holder section 103 outwardly, the mold member 109 being carried by the said section 103 so that the cone will be fully exposed and may be engaged and withdrawn by the ejector.

It will be readily noted that the first opening of the mold occurs while the core is down so that the cone will adhere to the back mold member. Consequently, when the core is raised and the mold is opened, the cone will not swing out with the front mold member but will remain in position in the inner mold member so that it may be engaged by the ejector and withdrawn.

Meshing with the rack 30 on the under side of the movable table 31 is a pinion 160 on the inner end of a shaft 161 which extends forwardly over the stationary table 2 adjacent a discharge opening 162 therein, a chute 163 leading from the said opening to deposit the cones upon a belt 164. The shaft 161 is provided intermediate its ends with a beveled pinion 165 meshing with a similar pinion 166 upon a shaft 167 which extends through and below the table 2 and is equipped at its lower end with a pinion 167' meshing with a similar pinion 168 upon a shaft 169 which carries the drum or roller 170 by which motion is imparted to the belt 164, the shaft 169 being supported by a bracket 171 of any suitable construction depending from the stationary table. The shaft 161 is further provided at its front or outer end with a pinion 172 meshing with a similar pinion 173 on the end of a shaft 174 which is journaled in a standard or bracket 175 and is provided with a cam or tappet 176 at the end remote from the said pinion 173. This tappet or cam is three-armed preferably, as shown in Fig. 7, and the ends of its arms are adapted to impinge against the lower end 177 of a lever 178 which is fulcrumed upon the bracket 175 and has its upper end normally drawn forward by a spring 179 secured to the lever and to the bracket. This lever 178 has its upper end pivoted to the forward outer end of an ejector bar 180 which has an enlargement 181 at its inner end, an ejector finger 182 being pivoted upon said enlargement. A stop finger 183 is formed integral with the pivotal end of the ejector finger and is adapted to impinge against a stop shoulder 184 on the enlargement 181. Pivoted to the ejector bar 180, intermediate the ends thereof, is a shoe 185 which is provided on its inner edge, adjacent its fulcrum, with a lug or offset 186 adapted to rest upon a longitudinal rib 187 on the ejector bar. A supporting ledge or rib 188 is formed on the bracket 175 and the shoe 185 is adapted to ride on the said ledge. The ejector finger 182 depends from the head 181 so that if the opening movement of the pivoted member of the mold should carry said member against the ejector finger, the ejector will yield without causing a breakage of any of the parts and, when the open member of the mold has passed the ejector the finger will at once drop into position to engage the cone. When the ejector is moving toward the mold, the shoe 185 will rest upon the ledge 188 so that the ejector bar will be supported above the path of the upper end of the cone and it will be so supported until the finger 182 is over the cone at which time the shoe will clear the ledge and the finger will drop into the cone. The parts are so proportioned and timed that the shoe will clear the ledge just as the finger reaches a position over the cone and the tappet arm 176 will at the same time bring its shoulder 176' just clear of the shoulder 177' on the lever whereupon the spring 179 will at once quickly retract the ejector and withdraw the cone which will drop through the opening 162 and the chute 163 onto the belt 164. As the ejector is withdrawn, the shoe 184 will yield to the ledge and swing about its pivotal connection with the ejector bar so as to ride over the ledge without raising the ejector bar, but when the ejector again moves inward, the offset 186 by engaging the rib 187 limits the swinging movement of the shoe and the bar is raised as shown in Fig. 7.

Immediately after the ejector has withdrawn the baked cone, the travel of the mold will bring the same into position to receive oil from the nozzles 124 and 125 and almost simultaneously with this operation the lower end of the latch 117 will engage the inner side of a stationary cam 189 and the outer mold member will ride against a roller 190 mounted on the upper end of a lever 191 rising from the stationary table so that the mold will be closed and the beak of the latch automatically reëngage the tooth 115 and thereby lock the mold. By this time the core will have reached the highest point of the cam 126 and the mold will be under the discharge port of the dough ejector or pump whereupon the cycle of operations will be repeated.

As shown most clearly in Fig. 5, the lower end of the lever 191 is pivoted between lugs 192 on the under side of the table 2 and is provided with a rearwardly extending arm 193 which is normally pressed downwardly at its inner end by a spring 194 disposed between the same and the under side of the table. This arrangement projects the roller 190 to such position that it will engage the outer face of the open mold member however far said member should happen to swing in its opening movement and, as the mold is carried past the roller, the roller will yield to the progress of the mold and will travel across the same remaining in contact therewith until it is fully closed and is locked. The yieldable mounting of the roller, moreover, avoids the injurious shocks which might be caused by impact of the mold against a fixed closing instrumentality. The cam 189 is also yieldably mounted so as to avoid injurious shock and to follow the closing movement of the latch. By reference to Fig. 21, it will be noted that the cam is in the form of a rail or bar at the end of the upstanding arm of an angle lever 195 pivoted upon a bracket 196 which is secured upon the table 2. At its inner end, the bracket is provided with an arm 197 having an eye or guide 198 at its upper end. A pin 199 rises from the inner end of the lever 195 and plays in said guide, a spring 200 being coiled around the pin between the guide and the end of the lever and tending to depress the lever. Upon reference to Fig. 4, it will be noted that the cam 189 is so disposed that the latch will engage the same immediately after leaving the cam 153 and tends to swing the cam 189 forwardly thereby putting the spring 200 under a tension which will turn the latch to locking position.

It will be seen from the foregoing description, taken in connection with the accompanying drawings, that I have produced a machine which will be automatic in its operation and which will perform every necessary step in the production of ice cream cones, except the making of the batter, the chipping or breaking away of the surplus material from the baked cone, and the assembling and wrapping of the cones in packages. Especial attention is invited to the fact that the core and the members of the mold are solid throughout so that they will not only prove durable under the application of high temperatures but, when thoroughly heated, will retain the heat for a considerable period so that the portion of the dough which is formed into a cone will receive heat upon both its inner surface and its outer surface and will be thoroughly cooked. I provide means for venting the molds after the batter is placed therein so that the steam will be permitted to escape and will not blow holes in the cones or shatter or otherwise damage them. The peculiar formation of the mold members will provide a curved reinforced upper edge on the cone which will prevent cracking and will permit the formation of thinner cones than heretofore so that an economy in the use of the batter will be effected. Moreover, the peculiar formation of the molds will reduce the waste caused by the feeding of excessive batter into the molds and the surplus material which will form with this beaded edge of the cone may be easily chipped off before the cone is wrapped. The heat is applied to both ends of the mold so that it will be heated uniformly throughout and the application of heat is continued throughout the entire travel of the cone from the point where the mold is completely closed until it reaches the point where the opening operation begins. The molds are automatically opened and closed and the latch is automatically operated to release the molds and lock them in closed position. The feeder spout or tube, through which the batter passes to enter the mold, is kept cool inasmuch as there is always a portion of the batter in the same, and the finished cone is positively withdrawn from the mold and discharged. An especial advantage is derived from the arrangement for supporting the mold. The mold is not attached directly to the carrier but is fitted within a holder consisting of hingedly connected sections so that molds of any desired size and of any desired surface design may be readily fitted in the holder for the formation of any size or style of cone which may be wanted.

Having thus described the invention, what is claimed as new is:

1. In a machine for the purpose set forth, the combination of a mold, a core coöperating with the mold, means for heating the core and the mold, means for causing continuous and uninterrupted travel of the mold and the core, means for supplying batter to the mold during its travel, means for effecting entrance of the core into the batter during the travel of the mold and core, and means for checking the said entrance of the core without retarding the travel of the core and mold whereby to vent the mold.

2. A machine for the purpose set forth comprising a sectional mold adapted when closed to receive a charge of batter, a core adapted to penetrate the batter in the mold, means for moving the mold and the core continuously and uninterruptedly over an endless path, means for heating the mold and the core during the travel over said path, means for withdrawing the mold after the batter is cooked, means for withdrawing the cooked batter sidewise, means for supplying a second charge of batter to the mold, and means for returning the core to its initial position after a second charge of batter has been placed in the mold.

3. A machine for the purpose set forth comprising a mold constructed to open and close, a core adapted to fit within the mold, means for moving the mold continuously and uninterruptedly over a fixed path, means for heating the mold and core during travel over said path whereby to cook a charge of batter deposited in the mold, means for withdrawing the core after the batter is cooked, means for opening the mold to permit discharge of the cooked batter, means for positively withdrawing the cooked batter sidewise, means for closing the mold to permit the deposit of a second charge of batter, and means for then returning the core to its position within the mold.

4. In a machine for the purpose set forth, the combination of a mold consisting of hingedly connected sections, means for moving the mold continuously and uninterruptedly over an endless path, means for heating the mold during its travel over said path, means for opening the mold as it passes beyond the heating means, and an ejector movable across the axis of the mold to pass within the same and engage the article formed therein and withdraw it sidewise.

5. In a machine for the purpose set forth, the combination of hingedly connected mold members, a core fitting between said mold members, a latch mounted upon one mold member and normally engaging the other mold member to lock said members together, means for moving the mold and core continuously and uninterruptedly over an endless path, means for heating the mold and core during the travel over said path to cook batter deposited in the mold, means adjacent the path of travel to be engaged by and release the latch as the mold passes beyond the heating means, means for then separating the mold members to permit discharge of the formed article, means for closing the mold members, and means adjacent the path of travel to be then engaged by the latch and return the same to closed position.

6. A machine for the purpose set forth comprising a mold adapted to receive a charge of material and consisting of relatively movable members, a core adapted to penetrate the material and shape the same, means for causing the core to initially enter said material, other means for interrupting said penetrating action, other means for subsequently forcing the core home, means for continuously and uninterruptedly moving the mold and core over a fixed path, means for heating the mold and core during travel over said path, means for momentarily separating the mold members as they pass beyond the heating means to loosen the formed article, means to withdraw the core, means to again separate the mold members to permit discharge of the formed article, and means for preventing separation of the mold members while they are exposed to the heating means.

7. A machine for the purpose set forth comprising a mold, a core, means for moving the same over a fixed path, means for lifting the core from the mold during the travel of the mold, means for returning the core to the mold, yieldable means for interrupting the return movement of the core, and a yieldable presser to subsequently act upon the core and drive the same home.

8. A machine for the purpose set forth comprising a mold, a core, means for moving the assembled members over a fixed path, a stationary cam interposed in said path to be engaged by the core whereby said member will be withdrawn from the mold, a guide rail disposed adjacent said cam to cause a return movement of the core, a yieldable supporting rail disposed adjacent said guide rail to check said return movement of the core, and means for forcing the core home after it leaves said supporting rail.

9. A machine for the purpose set forth comprising a mold, a core, means for moving the same over a fixed path, a stationary cam interposed in said path to be engaged by the core whereby said core will be lifted from the mold, a guide rail disposed adjacent said cam to cause the return of the core to the mold, a counter-balanced supporting rail disposed adjacent and below the said guide rail to check the said return movement of the core, and a yieldable presser disposed beyond the said counter-balanced rail to engage the core and force the same home.

10. A machine for the purpose set forth comprising a mold, a core, means for moving the assembled members over a fixed path, a stationary cam interposed in said path to be engaged by the core whereby said member will be lifted from the mold, a guide rail disposed adjacent the stationary cam to cause a return movement of the core, a yieldable supporting rail coöperating with the said guide rail to check the return movement of the core, a yieldable presser disposed beyond the said supporting rail to exert a downward pressure upon the core, and a pivotally mounted presser arranged to ride over the top of the core.

11. In a machine for the purpose set forth, the combination of a carrier, a holder consisting of a section secured rigidly to said carrier and a second section hinged to the first-mentioned section, a mold consisting of sections fitted within and supported by the respective holder sections, a core supported on the carrier for vertical movement and adapted to fit within the mold and travel therewith, a latch pivoted upon one of the holder sections and adapted to engage the other holder section to lock them normally together, means for moving the carrier to effect continuous uninterrupted travel of the mold over a predetermined path, means adjacent said path to be engaged by the latch whereby to release the same and permit opening of the holder, and other means adjacent the path of travel to be engaged by the latch and return same to locked position after the holder is closed.

12. In a machine for the purpose set forth, the combination with a carrier, means for moving the carrier over a predetermined path, of a holder consisting of a section secured rigidly to said carrier, a second section hinged to the first-mentioned section, a mold inclosed within said holder sections, a core mounted for vertical movement upon the carrier and adapted to fit within said mold, a tooth on one of the holder sections, a latch pivoted on the other holder section and having a hooked end adapted to engage the said tooth whereby to retain the holder in closed position, means adjacent the path of travel to be engaged by the tail of the latch and effect release of the latch, and other means adjacent the path of travel to be engaged by the tail of the latch and return the latch to locking position after the holder is closed.

13. In a machine for the purpose set forth, the combination of a carrier, means for moving the carrier over a predetermined path, a holder comprising a section secured rigidly to said carrier, a second section hinged to the first-mentioned section, a mold inclosed within the said holder, a core mounted for vertical movement upon the carrier and adapted to fit within the mold, a tooth formed upon one of the holder sections, a latch pivoted upon the other holder section and having an upper end adapted to engage said tooth, means for moving the carrier, a stationary cam adjacent the path of travel to be engaged by the lower end of the latch whereby the latch will be swung out of engagement with the tooth, and a second stationary cam adjacent the line of travel beyond the first mentioned cam to be engaged by the lower end of the latch whereby the upper end of the latch will be returned to engagement with the tooth.

14. In a machine for the purpose set forth, the combination of a carrier, means for moving said carrier, a holder consisting of a section secured rigidly to the carrier, a second section, a rest on the second section, a pintle connecting the sections and supported by said rest, a mold fitted between the said holder sections and provided at its upper end with a lateral annular flange adapted to extend over the upper end of said pintle, and means for normally locking the holder sections together.

15. In a machine for the purpose set forth, the combination of a plurality of molds, means for moving the molds continuously in a fixed path, a feeder arranged to deposit a charge of material in one mold, an oiler arranged to simultaneously oil another mold, a valve controlling the said oiler, a lever connected with said valve, means acting on one end of the lever to hold the valve normally closed, a stop adjacent said lever to limit the action of said means, an operating shaft, means for rotating said shaft, a cam on said shaft adapted to operate the feeder, and a tappet on the shaft in fixed relation to the said cam and adapted to act on said lever whereby to momentarily open said valve.

16. In a machine for the purpose set forth, the combination of a plurality of molds, means for moving said molds continuously over a fixed path, a feeder adapted to supply a charge of material to the molds successively, an oiler arranged to spray the molds successively prior to receiving material to be formed, an operating shaft, means for rotating said shaft comprising a power-receiving gear wheel loosely mounted on the shaft, means for locking the wheel to the shaft, a cam loosely fitted on said shaft and adapted to actuate said feeder, a tappet loosely mounted on the shaft adjacent the cam and adapted to actuate said oiler, and means for locking the cam and the tappet to the gear wheel.

17. In a machine for the purpose set forth, the combination of a carrier, a mold secured to said carrier, means for moving the carrier, posts rising from the carrier, a supporting arm provided at its inner end with vertically spaced eyes slidably engaging one of said posts and provided between its ends with an annulus fitting around the other of said posts in spaced relation thereto, guide pins adjustably mounted in said annulus and engaging the said post at diametrically opposite points of the same, and a core carried by the outer end of said arm and coöperating with the mold.

18. In a machine for the purpose set forth, the combination of a mold, means for moving the mold with its axis vertical in a fixed path, an ejector pivotally and slidably mounted at one side of the path traveled by the mold, means for moving the ejector laterally over the mold and then laterally and downwardly to positively withdraw the article in the mold, and yieldable means for supporting the ejector during a portion of its initial movement.

19. In a machine for the purpose set forth, the combination of a mold, means for moving the mold in a fixed path, an ejector bar movable at an angle to the path of the mold, and an ejector finger yieldably mounted at the end of said bar to ride over the mold and enter the same to engage and withdraw an article formed in the mold.

20. In a machine for the purpose set forth, the combination of a mold, means for moving the mold in a fixed path, an ejector bar movable toward and from the path of the mold and having an enlargement at its inner end, said enlargement being provided with a stop shoulder at one side, and an ejector finger pivotally mounted upon said enlargement and having a stop adapted to engage said stop shoulder.

21. In a machine for the purpose set forth, the combination of a mold, means for moving the mold in a fixed path, an ejector bar movable toward and from said path, an ejector finger carried by said bar and adapted to engage an article formed in the mold, a stationary support, and a shoe mounted upon the ejector bar and arranged to ride on said support to hold the ejector bar elevated when moving in one direction and to yield to said support and permit the ejector bar to assume a lower level when moving in the opposite direction.

22. In a machine for the purpose set forth, the combination of a mold, means for moving the mold in a fixed path, a support disposed at one side of said path, an ejector bar mounted adjacent said support and having a longitudinal rib on one side, an ejector finger carried by the inner end of the said bar and adapted to engage the article formed in the mold, a shoe pivoted to the ejector bar and provided with an offset adapted to bear upon the rib on said bar, said shoe being arranged to ride on said support and the said offset preventing swinging movement of the shoe when the ejector bar is moving in one direction and permitting the shoe to yield to the said support when the bar moves in the opposite direction, and means for operating the ejector bar.

23. In a machine for the purpose set forth, the combination of a mold, means for moving the mold in a fixed path, a support at one side of the path of the mold, a ledge on said support, a lever pivoted to the said support, a tappet acting on the lower end of said lever, an ejector bar pivoted to the upper end of the lever and projecting over the ledge and beyond the support, an ejector finger carried by the inner end of said bar and adapted to engage an article formed in the mold, a shoulder on the ejector bar, and a shoe pivoted to the bar and adapted to ride on said ledge and having an offset adapted to bear upon said shoulder.

24. In a machine for the purpose set forth, the combination of a mold, means for moving the mold in a fixed path, a support disposed at one side of the path of movement of the mold, a ledge on said support, a lever pivoted on the support, a spring connecting the upper portion of the lever with the support, a shoulder on the lever between the pivot thereof and the lower end of the same, a tappet bearing upon the lower portion of the lever below said shoulder and having a reduced portion adapted to clear said shoulder, an ejector bar pivoted to the upper end of the lever and extending beyond the support, an ejector finger carried by the inner end of said bar to engage an article formed in the mold, and means carried by the ejector bar and engaging the ledge to hold the bar raised during its inward movement and permit a descent of the bar before its outward movement.

25. A machine for the purpose set forth comprising a mold, means for heating the same, a core, means for causing the core to enter the mold, and means for positively checking the entrance of the core whereby to vent the mold.

26. In a machine for the purpose set forth, the combination of a carrier, a mold supported by said carrier, a vertically movable bracket mounted upon the carrier and provided with a clamp at its free end, a core adapted to enter the mold and having a head to extend over the top of the mold and a stem rising centrally from said head to be engaged by the clamp at the free end of the vertically movable bracket, and an adjusting device mounted in the bracket and bearing upon the head of the core.

27. A machine for the purpose set forth comprising a mold consisting of a movable and a relatively stationary section, a core arranged to enter the mold, means for moving the mold and core over a predetermined path, means for moving one section of the mold from the article formed therein, the article being retained in the other section by the core, means for subsequently removing the core from the article, and means for then engaging the article and positively withdrawing it laterally from the relatively stationary section of the mold.

28. The combination of a carrier, a mold, a vertically movable bracket mounted on the carrier, a core secured to said bracket to coöperate with the mold, means for releasing the core from the mold and then returning it to the mold, a presser arranged to ride over the top of the core and force the same home in the mold, a presser rail arranged adjacent the path of travel of the mold and core to engage the bracket and hold the core down in the mold, and means for varying the pressure exerted by said rail.

In testimony whereof I affix my signature.

WERD W. TURNBULL. [L. S.]